United States Patent
Pol et al.

(10) Patent No.: US 11,828,312 B2
(45) Date of Patent: Nov. 28, 2023

(54) METHOD FOR TEMPORARILY RELEASING SCREW ANCHORAGE

(71) Applicant: Hilti Aktiengesellschaft, Schaan (LI)

(72) Inventors: Frederic Pol, Feldkirch (AT); Cristian Jimenez, Sankt Gallen (CH); Michael Ziltener, Siebnen (CH); Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 481 days.

(21) Appl. No.: 17/266,506

(22) PCT Filed: Jul. 29, 2019

(86) PCT No.: PCT/EP2019/070309
§ 371 (c)(1),
(2) Date: Feb. 5, 2021

(87) PCT Pub. No.: WO2020/030459
PCT Pub. Date: Feb. 13, 2020

(65) Prior Publication Data
US 2021/0301853 A1    Sep. 30, 2021

(30) Foreign Application Priority Data
Aug. 7, 2018   (EP) .................................... 18187718

(51) Int. Cl.
*F16B 13/14*    (2006.01)
*F16B 25/00*    (2006.01)

(52) U.S. Cl.
CPC ........ *F16B 13/141* (2013.01); *F16B 25/0026* (2013.01); *Y10T 29/49966* (2015.01)

(58) Field of Classification Search
CPC ....... F16B 13/14; F16B 13/141; F16B 13/147
See application file for complete search history.

(56) References Cited

U.S. PATENT DOCUMENTS 4,642,964 A * 2/1987 Kellison ............... F16B 13/141
                                                        52/705
5,490,365 A * 2/1996 Roth ..................... F16B 11/006
                                                        52/707

(Continued)

FOREIGN PATENT DOCUMENTS

| DE | 10 2011 003 127 A1 | 7/2012 |
| EP | 0 955 476 B2 | 11/1999 |
| WO | WO 2017/025318 A1 | 2/2017 |

OTHER PUBLICATIONS

PCT/EP2019/070309, International Search Report dated Oct. 14, 2019 (Two (2) pages).

(Continued)

*Primary Examiner* — Jason L Vaughan
(74) *Attorney, Agent, or Firm* — Crowell & Moring LLP

(57) ABSTRACT

A method for temporarily releasing a screw anchorage includes unscrewing and removing a primary screw having a thread that is tappingly engaged in a mating thread in an ungrouted hole in a mineral substrate from the ungrouted hole. Subsequently to the unscrewing and removing, a retrofitting screw is screwed into the hole to form an annular gap between the retrofitting screw and the mineral substrate. A hardenable grout is placed in the annular gap and the hardenable grout is hardened in the annular gap.

9 Claims, 1 Drawing Sheet

(56) References Cited

U.S. PATENT DOCUMENTS

| | | | |
|---|---|---|---|
| 5,730,557 A | | 3/1998 | Skupien et al. |
| 5,895,186 A | * | 4/1999 | Giannuzzi ................ C09J 9/005 411/428 |
| 9,273,714 B2 | * | 3/2016 | Jackson ................ E01D 19/103 |
| 2010/0247267 A1 | | 9/2010 | Bianchi et al. |
| 2017/0138390 A1 | | 5/2017 | Hakenholt et al. |

OTHER PUBLICATIONS

Ultimate Handyman, "Concrete screws | Masonry screws", YouTube video, URL:https://www.youtube.com/watch?v=POLXQG3S8ko, Nov. 8, 2011, XP054979112, (One (1) page).

* cited by examiner

METHOD FOR TEMPORARILY RELEASING SCREW ANCHORAGE

CROSS REFERENCE TO RELATED APPLICATIONS

This application claims the priority of international Application No. PCT/EP2019/070309, filed Jul. 29, 2019, and European Patent Document No. 18187718.4, filed Aug. 7, 2018, the disclosures of which are expressly incorporated by reference herein.

BACKGROUND AND SUMMARY OF THE INVENTION

The invention relates to a method for temporarily releasing a screw anchorage.

EP0955476 B2 discloses a fixing arrangement in a concrete substrate, including a tapping screw arranged in a hole, wherein the hole is so filled with a hardenable grout that an annular gap between the wall of the hole and the screw is completely filled with the grout and, when the grout has hardened, the thread of the screw is embedded partly in the substrate and partly in the shell of grout.

US20102 47267 A1 proposes specific concrete screw shaft diameters, in relation to the diameter of the drill for making the hole in which the screw is to be placed. A grout can be optionally used.

WO17025318 A1 describes a method for installing a concrete screw in concrete, in which a preliminary tread is cut in a first step and subsequently, the concrete screw is screwed into this preliminary thread, thereby widening the preliminary thread.

DE102011003127 A1 describes a glass cartridge containing a hardenable grout, wherein the glass cartridge is provided with a mechanical holding part, which is designed as a retaining spring. The cartridge is placed in a borehole and a screw is subsequently screwed in, thereby opening the cartridge.

US2017138390 A1 discloses a system for dispensing hardenable grout when a screw is screwed into a concrete borehole.

U.S. Pat. No. 5,730,557 A describes a mortar mixture unit for chemical attachment of anchors in holes, which includes an essentially cylindrical container, which can be ruptured when inserting the anchor into the hole.

It is an object of the invention to provide a method for temporarily releasing a tapping screw anchorage which, while being easy and reliably to perform, provides particularly good and continuous anchor performance.

According to the invention, there is provided a method for temporarily releasing a screw anchorage, in which:
  a primary screw having a thread that is tappingly engaged in a mating thread in an ungrouted hole in a mineral substrate is unscrewed and removed from the hole,
  a retrofitting screw is subsequently screwed into the hole, thereby forming an annular gap between the retrofitting screw and the substrate, and
  hardenable grout is placed in the annular gap, and the hardenable grout is hardened in the annular gap.

Thus, according to the invention, hardenable grout is only applied when the screw anchorage is re-installed, but not in the initial installation process.

It is sometimes desirable that the anchorage provided by a tapping screw tapped into a mineral substrate is released and then re-established, for example if the part attached by the tapping screw is to be relocated or replaced. It was, however, found that when a tapping screw is unscrewed and subsequently the same screw or a same type screw is screwed back into the hole, anchorage performance might not be as good as before anymore. In connection with the invention, it was, surprisingly, found that this performance drop can, at least partly, be related to substrate dust. Substrate dust, in particular concrete dust, arises when a tapping screw is screwed tappingly into a hole and when the screw cuts on the hole wall. Arising substrate dust can then collect between the lateral wall of the screw and the lateral wall of the hole and here, it can positively modified stress states in the surroundings of the screw, thereby improving anchorage performance, as described in US2010247267 A1. In connection with the invention, it was realized that when the screw is unscrewed, the original substrate dust will usually relocate, and no significant fresh substrate dust will be produced when the same or a similar type screw is screwed back in, resulting in the anchorage now performing differently as compared to the original installation. Based on this surprising finding, the invention proposes to use grout when the—originally ungrouted—screw anchorage is re-established. This is based on the reasoning that, once the grout is hardened, it is able to emulate the presence of substrate dust in the annular gap that is formed between the retrofitting screw and the substrate, thereby compensating or even overcompensating potential anchorage performance loss due to substrate dust relocation.

The primary screw can have a shaft, and a drive for imparting torque on the shaft, wherein the drive can for example be a hex head. The shaft defines a longitudinal axis of the primary screw, which longitudinal axis extends in the direction of insertion of the primary screw. The thread of the primary screw is provided on the shaft of the primary screw and winds around the shaft and the longitudinal axis of the primary screw. The thread of the primary screw can have one or more thread flights. At the beginning of the method, the thread of the primary screw is tappingly engaged in a mating thread, which implies that the thread is located in a mating thread which has been, at least partly, cut by the thread itself. At the beginning of the method, the primary screw is located in an ungrouted hole, i.e., in a hole that is not provided with a grout liner. The primary screw is a tapping screw.

The retrofitting screw can have a shaft, and a drive for imparting torque on the shaft, wherein the drive can for example be a hex head. The shaft defines a longitudinal axis of the retrofitting screw, which longitudinal axis extends in the direction of insertion of the retrofitting screw. The thread of the retrofitting screw is provided on the shaft of the retrofitting screw and winds around the shaft and the longitudinal axis of the retrofitting screw. The thread of the retrofitting screw can have one or more thread flights. The retrofitting screw can also be a tapping screw, The annular gap formed between the retrofitting screw and the substrate when screwing in the retrofitting screw can be understood to be the space located between the lateral surface of the retrofitting screw, in particular between the lateral surface of the shaft of the retrofitting screw, and the lateral surface of the hole. The annular gap can form a continuous annulus or it can also form a discontinuous, interrupted annulus, for example when the shaft of the retrofitting screw touches the wall of the hole, in particular when the shaft is not exactly centred in the hole or when the hole is not exactly cylindrical. The annular gap is formed as a consequence of screwing the retrofitting screw into the hole and/or while screwing the retrofitting screw into the hole. In particular, the retrofitting screw is screwed into the hole and in doing so, the annular gap is formed between the retrofitting screw and the substrate.

The grout comprises a hardenable mass and can for example be epoxy-based or cement-based. The grout can preferably be a mortar. In a simple embodiment, hardening of the hardenable grout in the annular gap can be performed by allowing curing time of the grout to lapse. Being mineral, the substrate comprises mineral construction material. It is particularly preferred that the mineral substrate is a concrete substrate, since in concrete, the described positive effect of substrate dust, concrete dust in this case, can be particularly significant. The substrate can also be a masonry substrate.

Preferably, the retrofitting screw and the primary screw have same thread pitch and/or same thread core diameter. Due to this geometric resemblance, particularly easy re-installation is possible and a particular good load behavior of the retrofitting screw can be obtained.

The retrofitting screw can be a used screw, in particular a tappingly-used screw, i.e., a screw that has been tapped into a mineral substrate, in particular a concrete substrate, before. Due to the stabilizing effect of the grout, the retrofitting screw can have a worn thread before it is screwed into the hole in the inventive method.

The primary screw and the retrofitting screw are preferably of the same type. For example, a screw that has been previously used in a neighboring attachment point can be used as retrofitting screw. Being of the same type can imply that both screws, within usual manufacturing and wear tolerances, have the same shape and/or material composition.

It is particularly advantageous if the retrofitting screw and the primary screw are one and the same, i.e., if both screws are identical. Thus, the primary screw that has been removed from the hole is subsequently screwed back into the hole, thereby forming the annular gap between the screw and the substrate. In particular, the same screw that has been previously removed screwingly from the ungrouted hole is screwingly re-inserting into the hole, and only in connection with the re-insertion, the annular gap surrounding the screw in the hole is filled with hardenable grout, which is then hardened.

It is particularly preferred that, when the retrofitting screw is screwed into the hole, the thread of the retrofitting screw is screwed into the mating thread, in particular screwed into screw engagement with the mating thread. Thus, when the retrofitting screw is screwed in, its thread follows the already-available mating thread. This can allow particularly efficient re-installation without compromising on performance, since the effect of substrate dust is emulated by the grout after re-installation, and therefore, no tapping action for producing substrate dust is required during re-installation.

According to another preferred embodiment of the invention, a quantity of hardenable grout is placed in the hole before the retrofitting screw is screwed into the hole, and at least a fractional amount of this quantity of hardenable grout is subsequently placed in the annular gap. The quantity of hardenable grout can for example be located in a cartridge that is inserted into the hole, or the quantity can be injected into the hole using a dispenser. When the retrofitting screw is screwed into the hole, it can displace at least a fractional amount of the quantity into the annular gap, in particular by piston action exerted by the retrofitting screw. Advantageously, the hole can be a blind hole, which can facilitate displacement action of the retrofitting screw.

The annular gap can be filled only partially or filled completely with hardenable grout.

The ratio of the outer diameter of the thread of the primary screw to the pitch of the thread of the primary screw can be between 1 and 2, especially between 1.2 and 1.45. These are typical thread dimensions for screws that are intended for tapping insertion into mineral substrates, e.g., concrete or masonry substrates. In particular, and in line with the usual definition, the pitch can be understood to be the axial distance between successive turns of a thread flight.

For the same reason, the ratio of the outer diameter of the thread of the retrofitting screw to the pitch of the thread of the retrofitting screw can be between 1 and 2, especially between 1.2 and 1.45

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

DETAILED DESCRIPTION OF THE DRAWINGS

Figure 1:
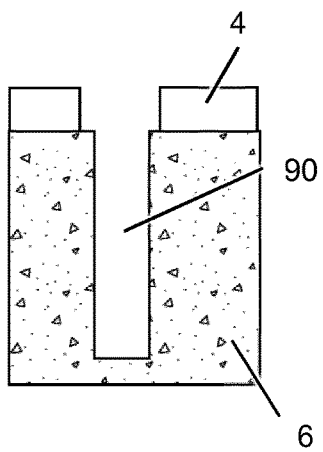
FIGS. 1 to 2 show consecutive steps of an example of a method for installing a primary screw in a hole in a mineral substrate.
Figure 2:
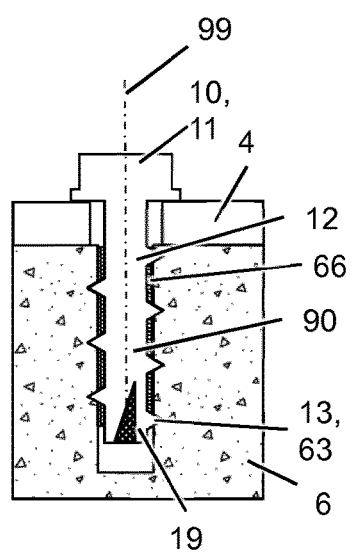

FIGS. 1 to 2 show, in side view, consecutive steps of an example of a method for installing a primary screw in a hole in a mineral substrate, thereby providing an anchorage of an attachment part on the substrate.

First, and as shown in FIG. 1, a hole 90 is provided in a substrate 6. The substrate 6 is a mineral substrate, preferably a concrete substrate, and the hole 90 can be a blind hole, that can for example be provided by drilling. An attachment part 4 is arranged at the surface of the substrate 6 surrounding the hole 90, so that an opening in the attachment part 4 is aligned with the hole 90.

A primary screw 10 is then provided, which has a shaft 12 defining a longitudinal axis 99, and a thread 13 arranged on the shaft 12 and helically surrounding the shaft 12 and the longitudinal axis 99. The primary screw 10 is a tapping screw, which means that the primary screw 10, in particular its thread 13, is able to cut the substrate 6 and to form a mating thread 63 in the substrate 6. The primary screw 10 has a drive for imparting screw torque on the primary screw 10. In the present case, the drive is a head 11, in particular a hex-head.

The primary screw 10 can have one or more cutting edges 19, provided on the shaft 12 near the tip of the primary screw 10, for reaming the hole 90.

The primary screw 10 is screwed into the hole 90, rotating around the longitudinal axis 99, and in this connection, the thread 13 of the primary screw 10 forms a mating thread 63 in the substrate 6, namely in the lateral wall of the hole 90. Due to this tapping action of the thread 13, and, if present, also due to the reaming action of the cutting edges 19, substrate dust 66 arises between the lateral surface of the shaft 12 and the cylindrical lateral wall of the hole 90. The substrate dust 66 located between the respective lateral surfaces can contribute to the performance of the primary screw 10, for example by providing lateral support of the shaft 12 in the hole 90.

The primary screw 10 is screwed into the hole 90 until the head 11 of the primary screw 10, directly or via for example a washer, abuts on the attachment part 4, resulting in the configuration shown in FIG. 2.

Figure 3:
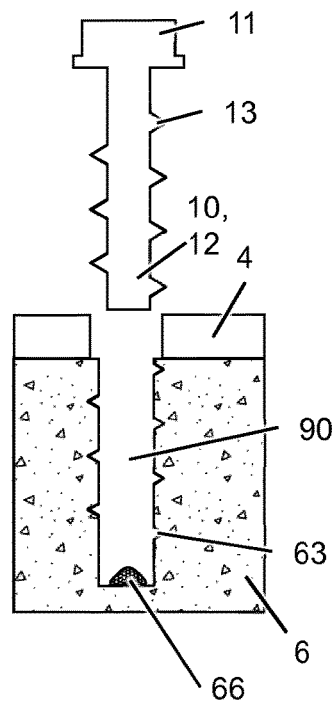
FIGS. 3 to 5 show consecutive steps of an example of an inventive method for temporarily releasing an anchorage that has been previously provided by the method of FIGS. 1 and 2.
Figure 4:
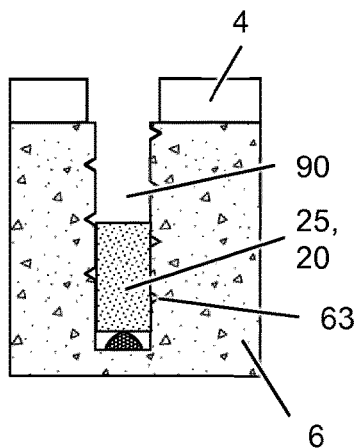
Figure 5:
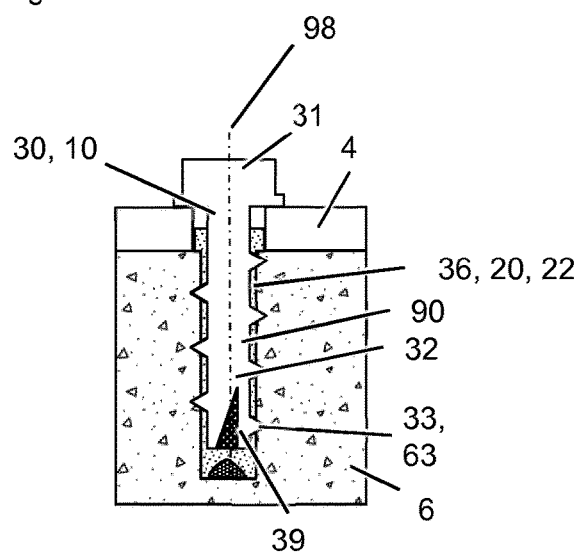

FIGS. 3 to 5 show, in side view, consecutive steps of an example of an inventive method for temporarily releasing screw anchorage of the attachment part.

First, and as shown in FIG. 3, the primary screw 10 is unscrewed from the hole 90, so that the thread 13 loses engagement with the mating thread 63, and the primary screw 10 is then removed from the hole 90. Anchorage previously provided by the primary screw 10 is thereby released, and it is now for example possible the remove the attachment part 4 from the substrate 6 and/or to relocate the attachment part 4.

As the primary screw 10 is unscrewed, substrate dust 66 formerly located around the shaft 12 falls down and relocates, as schematically shown in FIG. 3. Thus, if the primary screw 10 was now simply screwed back into the hole 90, in order to restore anchorage, the positive effect of the substrate dust 66 would be, at least partly, lacking.

In view of this, effect of substrate dust 66 is emulated by hardenable grout 20 when anchorage is restored. In particular, and as shown in FIG. 4, a quantity 25 of hardenable grout 20 is placed in the hole 90. This can for example be done by injecting grout 20 into the hole 90 using a dispenser or by placing a cartridge containing grout 20 in the hole 90. In particular if a cartridge is used, the hardenable grout 20 can be a two component hardenable grout. In particular, the hardenable grout 20 can be a mortar.

Subsequently, and as shown in FIG. 5, a retrofitting screw 30 is provided, which has a shaft 32 defining a longitudinal axis 98, and a thread 33 arranged on the shaft 32 and helically surrounding the shaft 32 and the longitudinal axis 98. The retrofitting screw 30 has a drive for imparting screw torque on the retrofitting screw 30. In the present case, the drive is a head 31, in particular a hex-head. The retrofitting screw 30 can have one or more cutting edges 39, provided on the shaft 32 near the tip of the retrofitting screw 30. The retrofitting screw 30 is a tapping screw, which means that the retrofitting screw 30, in particular its thread 33, is able to cut the substrate 6 and to form a mating thread in the substrate 6. The retrofitting screw 30 is of the same type as the primary screw 10.

The retrofitting screw 30 that is used here has been tappingly used before and therefore, its thread 33 is worn. In this example, the retrofitting screw 30 and the primary screw 10 are identical, i.e., the retrofitting screw 30 is the same as the primary screw 10 that has been previously removed from the hole 90.

The retrofitting screw 30 (which is the primary screw 10) is screwed into the hole 90, thereby re-engaging the mating thread 63 of the hole 90 with the thread 33 of the retrofitting screw 30. As the retrofitting screw 30 is lowered into the hole 90, it displaces hardenable grout 20, causing hardenable grout 20 to flow alongside the shaft 32 of the retrofitting screw 30 towards the mouth of the hole 90 into the annular gap 36 that arises between the shaft 32 of the retrofitting screw 30 and the wall of the hole 90. In the annular gap 36, the hardenable grout 20 forms a liner 22, covering the wall of the hole 90. The retrofitting screw 30 is screwed into the hole 90 until the head 31 of the retrofitting screw 30, directly or via for example a washer, abuts on the attachment part 4, resulting in the configuration shown in FIG. 5.

The hardenable grout 20 located in the annular gap 36 is allowed to harden. The liner 22 made up of now hardened grout 20 can now improve anchorage performance in a similar way the substrate dust 66 did before, so that the hardened grout 20 located in the annular gap 36 can substitute or possibly even overcompensate the effect of the now missing substrate dust 66.

The invention claimed is:

1. A method for temporarily releasing a screw anchorage, comprising the steps of:
   unscrewing and removing a primary screw having a thread that is tappingly engaged in a mating thread in an ungrouted hole in a mineral substrate from the ungrouted hole;
   subsequently to the unscrewing and removing, screwing a retrofitting screw into the hole to form an annular gap between the retrofitting screw and the mineral substrate;
   placing a hardenable grout in the annular gap; and
   hardening the hardenable grout in the annular gap.

2. The method according to claim 1, wherein the retrofitting screw and the primary screw have a same thread pitch and/or a same thread core diameter.

3. The method according to claim 1, wherein the retrofitting screw has been previously used to tap into a substrate prior to the screwing.

4. The method according to claim 1, wherein the retrofitting screw and the primary screw are of a same type.

5. The method according to claim 1, wherein the retrofitting screw is the primary screw.

6. The method according to claim 1, wherein when the retrofitting screw is screwed into the hole a thread of the retrofitting screw is screwed into the mating thread.

7. The method according to claim 1, wherein a quantity of the hardenable grout is placed in the hole before the retrofitting screw is screwed into the hole and wherein at least a fractional amount of the quantity is subsequently placed in the annular gap.

8. The method according to claim 1, wherein a ratio of an outer diameter of the thread of the primary screw to a pitch of the thread of the primary screw is between 1 and 2.

9. The method according to claim 1, wherein a ratio of an outer diameter of a thread of the retrofitting screw to a pitch of the thread of the retrofitting screw is between 1 and 2.

\* \* \* \* \*